US006993850B2

(12) United States Patent
Funke (10) Patent No.: US 6,993,850 B2
(45) Date of Patent: Feb. 7, 2006

(54) CONTINUOUS RECORDING OF THICKNESS, USING A MEASURING ROLLER WITH A BATH-SHAPED GUIDE SHOE, ARTICULATED IN PARALLEL (LONG TIMBER)

(75) Inventor: Hans Adolf Hugo Funke, Lüdenscheld (DE)

(73) Assignee: Noltronic Grecon Greten GmbH & Co. KG, Ludenscheid (DE)

( * ) Notice: Subject to any disclaimer, the term of this patent is extended or adjusted under 35 U.S.C. 154(b) by 0 days.

(21) Appl. No.: 10/257,093

(22) PCT Filed: Aug. 3, 2001

(86) PCT No.: PCT/EP01/08992

§ 371 (c)(1),
(2), (4) Date: Oct. 8, 2002

(87) PCT Pub. No.: WO02/21073

PCT Pub. Date: Mar. 14, 2002

(65) Prior Publication Data

US 2003/0074801 A1 Apr. 24, 2003

(30) Foreign Application Priority Data

Sep. 7, 2000 (DE) .......................... 200 15 505

(51) Int. Cl.
G01B 3/00 (2006.01)

(52) U.S. Cl. .................. 33/501.02; 33/501.04
(58) Field of Classification Search .............. 33/501.02, 33/501.03, 501.04, 832, 833, 834, 549, 555, 33/551, 553, 554; 324/207.11, 515, 160, 324/161, 162, 163, 176

See application file for complete search history.

(56) References Cited

U.S. PATENT DOCUMENTS 4,197,444 A * 4/1980 Pritchett ..................... 219/216

| | | | |
|---|---|---|---|
| 4,530,155 A | * 7/1985 | Burkhardt et al. | .......... 33/1 PT |
| 5,074,050 A | * 12/1991 | Williams | .................. 33/501.03 |
| 5,132,619 A | 7/1992 | Typpo | |
| 5,500,090 A | * 3/1996 | Autio | .......................... 162/273 |
| 5,561,251 A | * 10/1996 | Greminger et al. | ....... 33/501.03 |
| 6,199,289 B1 | * 3/2001 | Baechler | .................. 33/501.02 |
| 6,289,599 B1 | * 9/2001 | Leifeld et al. | ........... 33/501.02 |

FOREIGN PATENT DOCUMENTS

| DE | 27 29 575 | 1/1979 |
|---|---|---|
| DE | 29 28 085 | 1/1981 |
| DE | 32 21 379 A1 | 12/1983 |
| DE | 35 12 698 A1 | 10/1986 |
| DE | 88 06 230.9 | 9/1988 |
| DE | 195 01 186 A1 | 7/1995 |
| DE | 196 32 385 A1 | 3/1997 |
| JP | 60-20108 | 1/1985 |
| JP | 10-332361 | 12/1998 |

* cited by examiner

Primary Examiner—Christopher W. Fulton
(74) Attorney, Agent, or Firm—Synnestvedt & Lechner LLP (57) ABSTRACT

The invention relates to a measuring device, which allows the thickness of an elongated, panel-type workpiece, lying on a reference plane and traveling along the reference plane, to be continuously recorded. The measuring device is provided with a guide shoe, which is bath-shaped and open at the top and is pivotally mounted in a machine frame on parallelogram-shaped steering elements. A measuring roller, which projects slightly out of a cavity in a base section that runs parallel to the reference plane, is located inside the guide shoe. The measuring roller is supported in the interior of the guide shoe by rollers on both sides of the recess. The measuring roller is in contact with the reference plane and after a deflection of the guide shoe, comes into contact with the measuring surface of the workpiece, a measured value that represents the thickness being derived from the deflection.

33 Claims, 5 Drawing Sheets

CONTINUOUS RECORDING OF THICKNESS, USING A MEASURING ROLLER WITH A BATH-SHAPED GUIDE SHOE, ARTICULATED IN PARALLEL (LONG TIMBER)

FIELD OF THE INVENTION

The invention relates to a measuring device for continuously measuring and recording the thickness of elongate panel type objects.

BACKGROUND OF THE INVENTION

In order to check the thickness of elongate measurement objects, e.g. long timbers or panel-shaped material to be measured, it is known to provide a measuring system which is characterized by at least one measuring roller which is held above the measurement object and can be moved in the direction towards same. The zero setting of the measuring roller which is operatively connected to a pneumatic drive is formed by means of a reference plane, on which lies the measurement object and along which said measurement object can be moved at a defined speed. For its part, the measuring roller is also operatively connected to a measuring transducer, by means of which the displacement path of said measuring roller can be represented by a corresponding electrical signal.

The measuring procedure in the case of this known measuring system is performed in such a manner that the measuring roller is moved out from its withdrawn position above the measurement object in the direction of said object and brought into contact therewith, after the moving measurement object has arrived at a position below the measuring roller. However, in dependence upon the advance speeds of the measurement object on the one hand and the measuring roller on the other hand, it is not possible as a result to record the thickness of a starting region of the measurement object. Furthermore, the measuring roller is withdrawn starting from its position rolling on the surface of the measurement object, before the end of the measurement object is reached. This limitation at the beginning and the end of the measuring path on the measurement object was adapted inter alia to avoid causing any mechanical damage to the measuring system.

In order to improve the manner in which the measuring systems are protected from mechanical destruction measuring devices are currently used, in which a run-in ramp is provided. For this purpose, a run-in ramp is provided which is mounted on its end so as to be able to pivot about an axis in parallel with a reference plane. This run-in ramp is operatively connected at its free end facing away from its articulation to a measuring roller which by means of running rollers on both sides is supported on the inner side of this ramp and passes slightly through the base region thereof.

By reason of the measurement object which abuts against the underside of the base region of the run-in ramp, said run-in ramp is pivoted, wherein during the course of further advance movement the measuring roller finally moves into position against the surface of the measurement object. In dependence upon the advance speed and also upon the comparatively long lever arm between, on the one hand, the articulation point of the run-in ramp and, on the other hand, the measuring roller, extraordinarily high acceleration moments are produced for the measuring roller and above all the elements of the measuring systems which are functionally downstream of the measuring roller. In order to avoid vibration problems which arise due to an acceleration of the run-in ramp, there is provided a control, which is allocated to the pneumatic drive of the measuring roller, with the proviso that a counter force is developed at an early stage which suppresses excessive vibration. However, the disadvantage in this case is that the acceleration moments which are to be compensated are dependent both upon the advance movement of the measurement object and also upon its thickness.

The purpose of this known measuring system is to obtain the most complete information possible on the thickness of the measurement objects—as seen in the longitudinal direction thereof—wherein the measurement objects are guided through the measuring system at a defined advance speed and at different mutual end-side spaced intervals. One essential feature of these known measuring systems is that each time a measurement object has been passed through by means of the said pneumatic drive, the measuring roller is moved either to a withdrawn position or to a zero setting. The periods of time available for these considerable deflection movements turn out to be comparatively short in dependence upon the advance speed of the measurement objects and the mutual spaced intervals between them and consequently these periods must be concluded at a correspondingly high speed and with rapid reverse-control procedures. In addition to high material stress, this can also lead to considerable noise development. As a result, these conditions restrict the advance speed of the measurement objects.

SUMMARY OF THE INVENTION

Against this background, it is the object of the invention to design a measuring device of the type stated in the introduction with the proviso that the mechanical stress of the actual measuring system, in particular that of the measuring roller and the function elements disposed downstream thereof is reduced and in relation to the prior art set forth in the introduction it is possible to achieve an increase in the speed at which the measurement objects are advanced. In the case of this type of measuring device, this object is achieved by using a roller that can be moved toward and away from a reference plane. The roller is associated with a transducer which generates an electric signal. A measured value that represents the thickness of the object is derived from the signal based upon the motion of the roller. A guide shoe is disposed on pivoting links in the manner of a four-bar linkage and has an opening that accommodates the roller. The shoe has a base section that extends parallel to a reference plane from which the thickness of the objects is measured.

Accordingly, an aspect of the invention is a guide shoe which comprises a base section which extends in parallel with the reference plane and said guide shoe is pivotally disposed with respect to the machine frame by way of parallelogram-shaped levers. The end points of the parallelogram-shaped levers which form the articulation points thereof lie on the corners of a parallelogram, so that the parallelism between the base section and the reference plane is also maintained during the pivot movement of the guide shoe.

Supported on the guide shoe, lying opposite the reference plane, is the measuring head, of which the measuring roller passes slightly through a recess in the said base section. The measuring roller is intended to roll on the measurement object in a manner which is known per se.

As such the guide shoe is intended to be deflected, in particular pivoted, by an abutting measurement object, wherein the vertical component of the pivot movement is used in order to displace the measuring head.

As a result of the articulation of the guide shoe in the manner of parallel steering elements and of which the parallelogram-shaped levers extend virtually perpendicularly in a starting position or in such a manner that the respective lower articulation points are slightly deflected in the direction in which the measurement object is advanced, the abutment of the measurement object against the facing base region of the guide shoe causes said guide shoe to perform a movement which is made up of "simultaneous movement" in the advance direction and a vertical movement. The movement referred to lastly is linked via a sine function to the pivoting movement of the parallelogram-shaped levers, in particular their pivot angle about their upper articulation points, so as to produce in comparison with the prior art an extraordinarily small initial vertical acceleration and therefore loading of the measuring roller or the elements functionally downstream thereof.

Corresponding to the conditions, set by the length of the parallelogram-shaped levers and the geometric formation of the guide shoe base region facing the measurement object, the measuring system, in relation to the prior art set forth in the introduction, is subjected to substantially lower acceleration at the same advance speed, wherein the thickness of the complete length of the measurement object is measured. In turn, these acceleration conditions allow comparatively higher advance speeds, without the problem of excessive material stress arising.

Running rollers, positioned preferably on each side of the opening in the guide shoe, support the measuring roller. Since the measuring system can only be moved vertically, it is necessary to provide a movable support on the guide shoe in parallel with the reference plane.

The links supporting the guide shoe in its non-deflected state are angularly deflected in the direction which the objects to be measured move relatively to the guide shoe. It is advantageous that the guide shoe is held under resilient force in position against the running rollers. This resilient force in conjunction with the counter force applied by way of the drive of the measuring system serves to produce the measuring force which determines the contact pressure of the measuring roller on the measurement object.

The base region of the guide shoe is intended to cooperate directly inter alia with the edges or the surface of the measurement object to be treated. Its geometric shape in conjunction with the parallel-articulation of the guide shoe on the machine frame serves to influence significantly the movement and in particular the acceleration conditions of the measuring system. The guide shoe consists of a series arrangement of a comparatively steep ramp section, a comparatively flat ramp section, the base section, a comparatively flat ramp section and a comparatively steep ramp section. Two of the ramp sections are inclined in a descending manner and two are inclined in an ascending manner in the direction of travel of the objects to be measured.

Basically, the movements of the measuring system should be kept as small as possible and this is demonstrated initially by virtue of the fact that the measuring system is held between two consecutive measurement objects by means of its drive, e.g. a pneumatic drive, in a particular displacement position corresponding to the measured value of thickness of the respectively preceding measurement object. Equally, there is no complete withdrawal movement or a movement to a zero setting. The control device is set up in conjunction with peripheral elements associated therewith such that the drive of the measuring system in this sense is then controlled if the gap between two measurement objects is greater than a distance determined by the longitudinal extension of the guide shoe. If, conversely, the gap between two measurement objects is shorter than this distance, a corresponding reverse-control of the drive of the measuring system is omitted. This basic actual value storage of a measured value of thickness of a preceding measurement object produces a substantially lower level of mechanical stress on the measuring system, lower noise development and a lower energy requirement for the drive of the measuring system, i.e. lower air consumption in the case of a pneumatic drive.

It is also possible to reset the measuring head in a very short time by reason of the short displacement path.

Other embodiments of the measuring device in accordance with the invention, include a second guide shoe disposed and articulated below the object to be measured. The second guide shoe is connected to a second measuring system including a second measuring roller intended to scan the underside of the object, and wherein a measured value of thickness of the measurement object is derived from the displacement of the two measuring rollers with respect to a reference plane, so that in general the difference in the displacement of the two measuring rollers is measured. Preferably, it will be assumed that in comparison with the upper measuring roller, the lower measuring roller is only displaced slightly with respect to the reference plane, so that the lower measuring roller is operated without a guide shoe. However, it is also possible to operate the lower measuring roller with a guide shoe which structurally can correspond to the upper guide shoe, wherein by means of a corresponding actuation of the drive allocated to the lower guide shoe or to the lower measuring system, it is necessary to ensure that the guide shoe or the measuring roller lies in position against the underside of the measurement object.

In order to increase the operational security of the measuring device, in particular for protecting the measuring system in the event of a malfunction in the energy supply to the drive, the control device is arranged in such a manner that in the event of an interruption in the power supply to the drive, the measuring system remains in its last position or is moved to a withdrawn position.

DETAILED DESCRIPTION OF EMBODIMENTS

Figure 1:
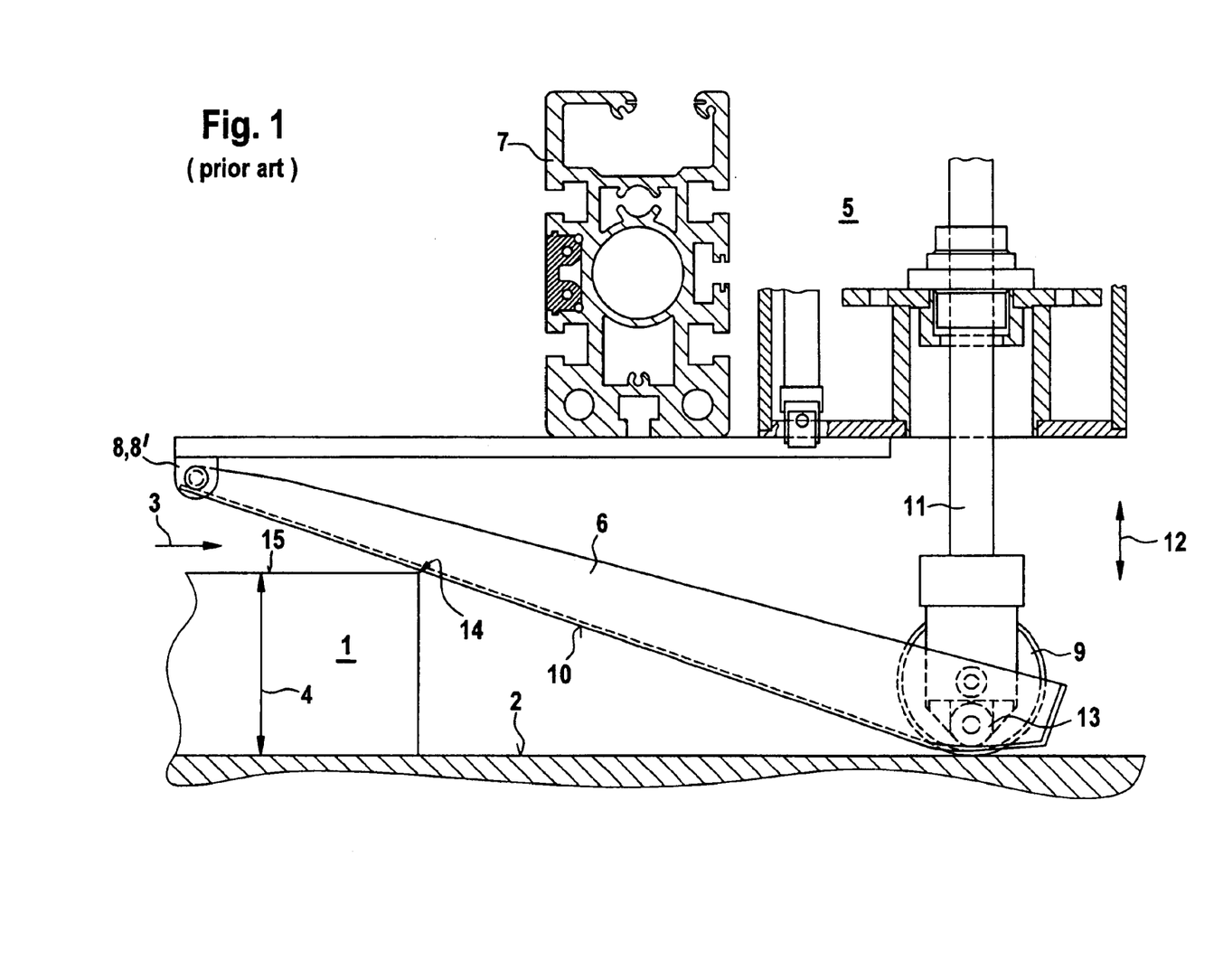
FIG. 1 shows a side view of a measuring device to be ascribed to the prior art in a partial sectional illustration.

In FIG. 1, the reference numeral 1 designates a panel-type measurement object which lies on a reference plane 2 and is moved at a defined speed in the direction of the arrow 3. The measurement object 1 comprises a finite thickness 4 perpendicular to the said reference plane 2, of which the progression—as seen in the longitudinal direction of the measurement object 1—is to be recorded during the passage of the said measurement object through the measuring device 5. The longitudinal extension of the measurement object 1 in this case runs parallel with the reference plane 2.

The reference numeral 6 designates a run-in ramp which is formed as an elongate bath-shaped basic body which is open on the upperside and which is articulated at its one end in a bearing block 8, which is affixed to a machine frame 7, so as to be able to pivot about a horizontal axis extending perpendicularly to the advance direction 3. The bearing block 8 is located at a spaced interval above the reference plane 2.

The reference numeral 9 designates a measuring roller which in the illustration shown lies on the reference plane 2 and in this case passes through a recess [not illustrated in the drawing] of the base region 10 of the run-in ramp 6. The measuring roller 9 is mounted at the end of a measuring linkage 11 in such a manner as to be able to rotate about an axis extending in parallel with the reference plane 2 and perpendicularly to the advance direction 3, wherein the entire system consisting of the measuring roller 9 and the measuring linkage 11 forms a measuring system which is operatively connected to a measuring transducer which is also not illustrated in the drawing. Its functional principle is to convert vertical movements of the measuring roller 9 with respect to the reference plane 2, i.e. in the direction of the arrows 12, into an electrical signal. This signal is transmitted to a control device and further processed in a suitable manner, in particular it is illustrated visually, stored etc..

The said measuring system is vertically supported on the inner side of the base region 10 by means of freely rolling running rollers 13 which are mounted on the measuring linkage 11 with the proviso that the measuring roller 9 protrudes by a defined distance from the underside of the run-in ramp 6.

Also not illustrated in the drawing is a drive, e.g. a pneumatic drive which is connected to the said control device and by means of which the measuring system can be displaced in the direction of the arrows 12.

The principle of this known measuring device is that by reason of the measurement object 1 which is moved at a defined speed in the advance direction 3 and which abuts with its edge 14 against the base region 10 of the run-in ramp 6, the said run-in ramp is pivoted about the axis of the bearing block 8, wherein this pivot movement triggers a vertical movement of the measuring linkage 11 by way of the said running rollers 13. This pivot movement ultimately causes the measuring roller 9 to roll on the upper side 15 of the measurement object, wherein according to the vertical deflection of the measuring system via the measuring transducer a corresponding measured value is generated. In each case, the aim is to record the progression of the thickness 4 of the measurement object in the direction of its longitudinal extension.

However, in dependence upon the thickness 4 of the measurement object 1 and the spaced intervals between the articulation point 8' of the run-in ramp 6 on the one hand and the primary abutment point of the measuring point 1 against the said base region 10 or the running rollers 13 on the other hand, considerable vertical acceleration of the measuring system is achieved. In particular, the relationship of the spacing of the running rollers from the articulation point to the spacing of the said abutment point from the articulation point serves accordingly to enhance the deflection movement of the run-in ramp 6 at the point where it interacts with the running rollers 13 and therefore the measuring system.

In order to avoid vibration problem and also to protect the measuring system mechanically, these kinematic boundary conditions render it necessary to develop a counter force by way of the drive allocated to said system, in coordination with the deflection movement of the run-in ramp 6. On the whole, these characteristics particularly in the case of measurement objects having comparatively large thickness dimensions inevitably serve, however, to limit the advance speed of the measurement object 1 considerably.

Figure 2:
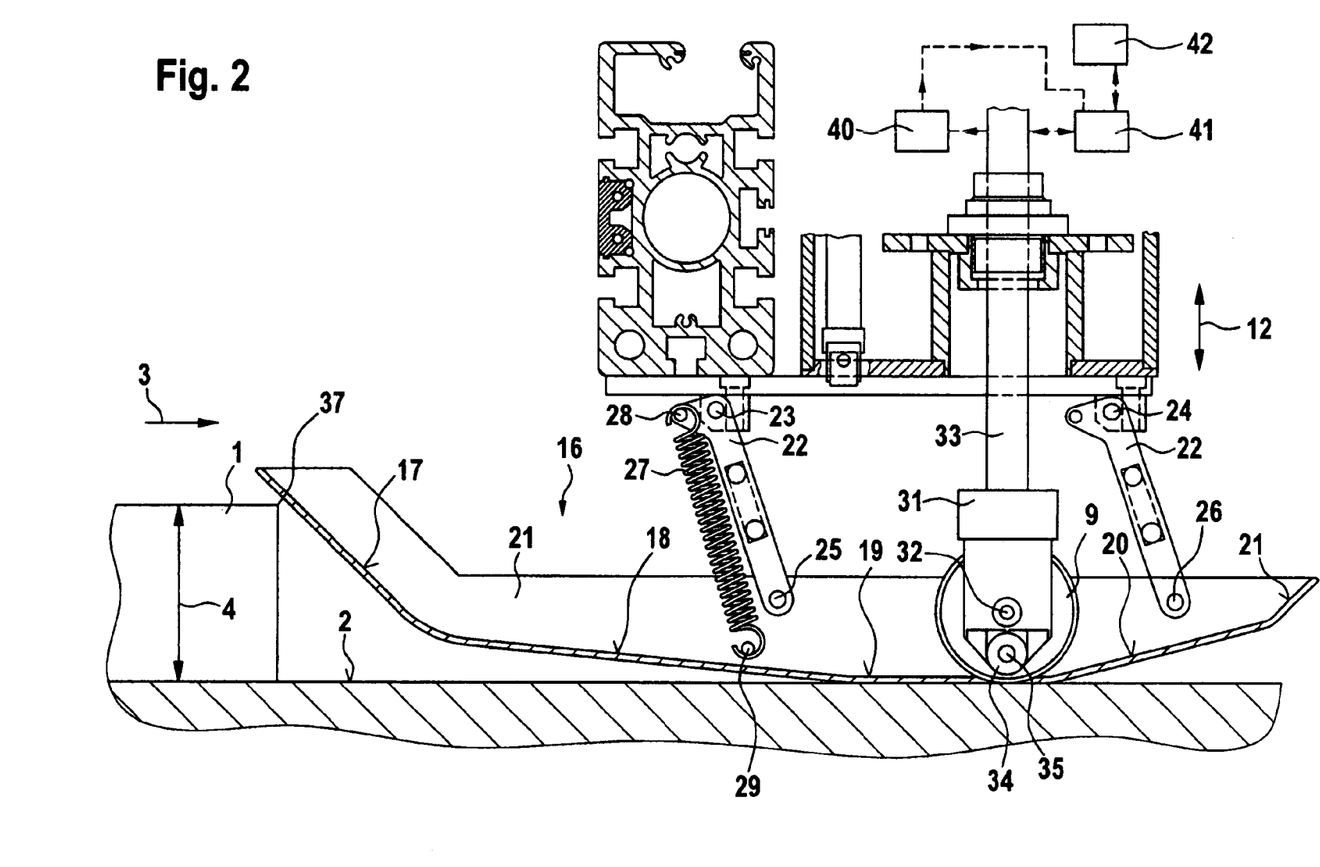
FIG. 2 shows a side view of the measuring device according to the invention in a partial sectional illustration.
Figure 3:
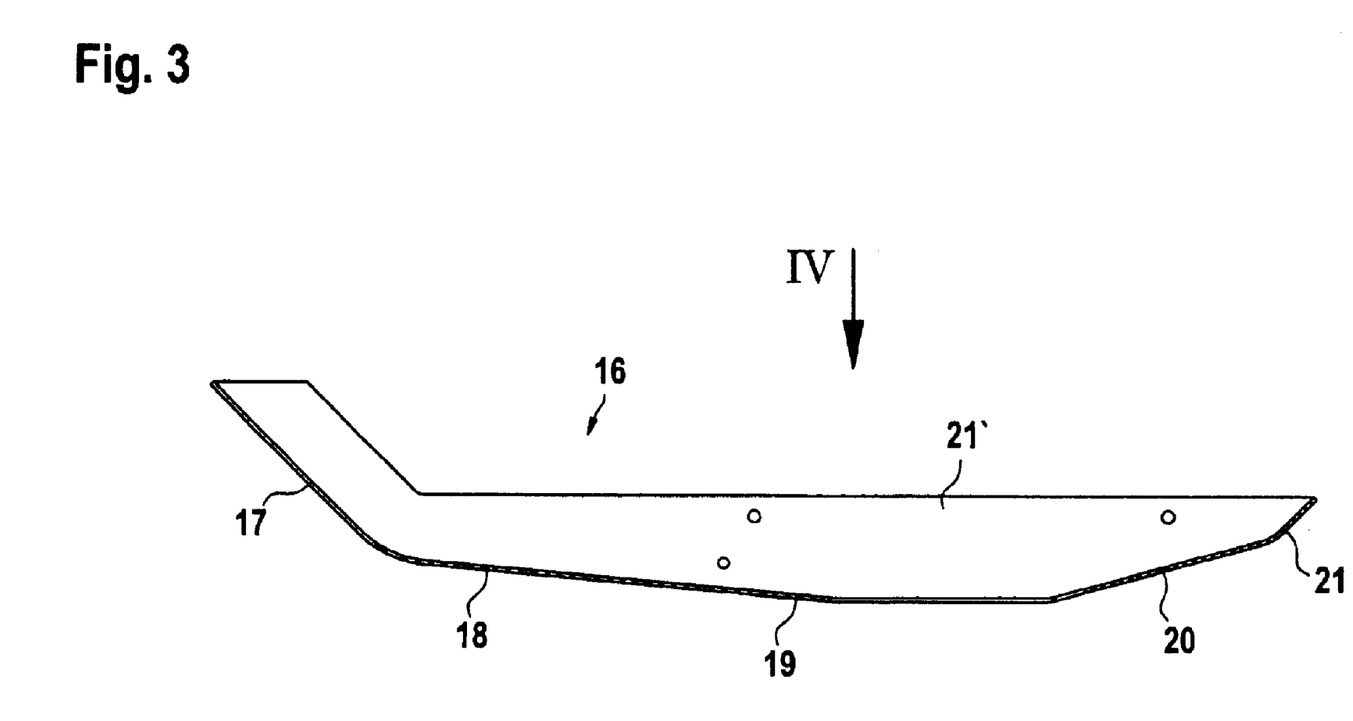
FIG. 3 shows a side view of the guide shoe used within the framework of the measuring device according to a sectional plane III—III in FIG. 3.
Figure 4:
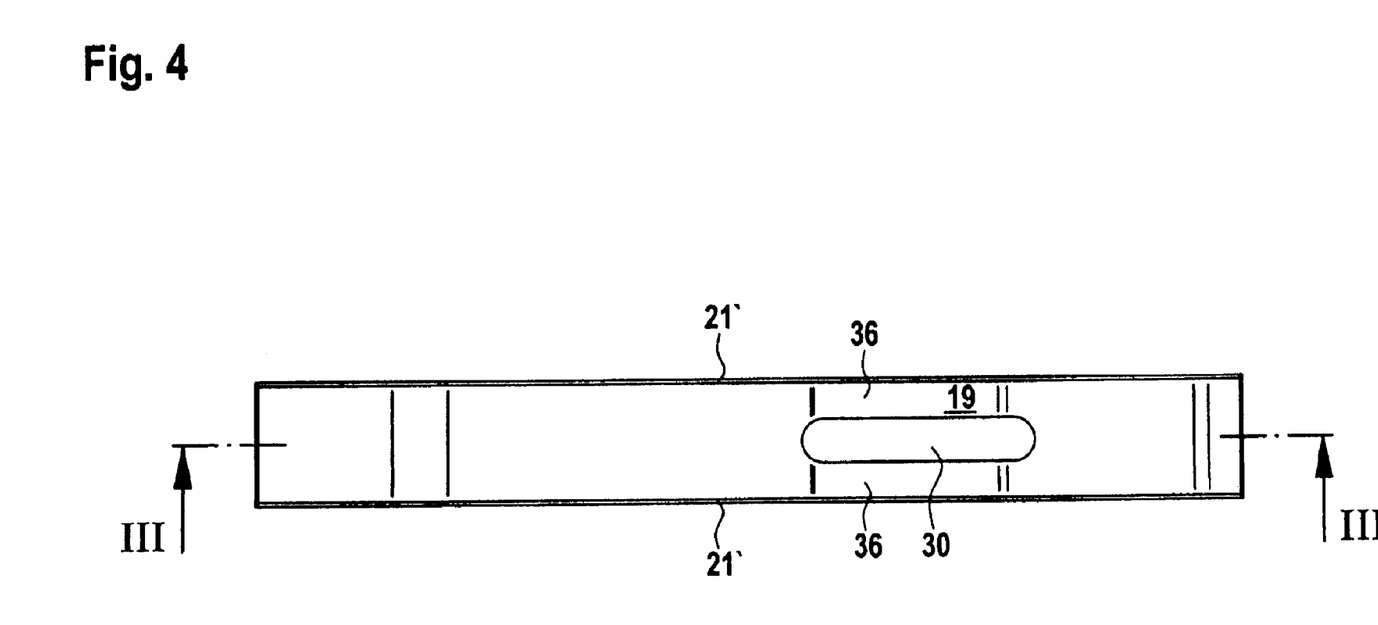
FIG. 4 shows a plan view of the said guide shoe according to the arrow IV in FIG. 3.

In the embodiment of a measuring device according to the invention illustrated by way of example in FIGS. 2 to 4 and explained in detail hereinunder, functional elements which correspond to those in FIG. 1 are numbered accordingly.

The reference numeral 16 designates a guide shoe which is mounted in a manner to be explained in detail hereinunder so as to be able to swing on the machine frame 7 and comprises a base section which is intended and arranged to cooperate with the measurement object 1. Seen from left to right, the base section consists of the series arrangement of a first comparatively steep ramp section 17, which extends e.g. at an angle of 45° with respect to the reference plane 2, a ramp section 18 adjoining said first ramp section and extending at a substantially shallower angle with respect to the reference plane 2, an adjoining base section 19 extending in parallel with the reference plane, a ramp section 20 which adjoins the last named base section and ascends with respect to the reference plane 2 in turn at a comparatively shallow angle, and an adjoining ramp section 21 extending at a comparatively steeper angle with respect to the reference plane 2. Adjoining the said ramp sections 17 to 20 is a sidewall 21', so that the guide shoe 16 generally has a bath-shaped configuration which is open towards the upper side.

The reference numeral 22 designates two identically configured parallelogram-shaped levers which are in particular the same length and which are articulated in a pivotal manner on the horizontally mutually spaced points 23, 24 of the machine frame 7. The points 23, 24 can each be formed by bolts which are located in a common horizontal plane.

Perpendicular to the plane of the drawing in FIG. 2, the parallelogram-shaped levers 22 are disposed in each case in pairs at a spaced interval with respect to each other, wherein their respective lower ends, i.e. the end remote from the points 23, 24, are articulated in a pivotal manner in points 25, 26 of the sidewalls 21' of the guide shoe 16, which points 25, 26 are located in turn in a common horizontal plane. In the starting position of the guide shoe 16 shown in FIG. 1, the two parallelogram-shaped levers 22 extend at an acute angle with respect to vertical planes extending through the points 23, 24, and furthermore such that the lower points 25, 26 are offset in the direction of the arrow 3 with respect to the upper points 23, 24. It is evident in these embodiments that the arrangement of the parallelogram-shaped levers forms a parallel steering arrangement for the guide shoe 16. It is essential that, with respect to the plane of the drawing in FIG. 1, on the one hand the points 23, 24 and on the other hand the points 25, 26 lie in each case on mutually parallel straight lines which also extend in parallel with the base section 19.

The reference numeral 27 designates a draw spring, of which one end is articulated on a point 28 located at a small spacing from the point 23 on the end of the parallelogram-shaped lever 22 facing said point, and the other end of said draw spring is articulated to a point 29 on the sidewall 21' of the guide shoe 16 which is spaced apart from the point 25 at this site. Each of the two parallelogram-shaped levers 22 which are adjacent to each other perpendicular to the plane of the drawing in FIG. 1 are allocated such a draw spring 27.

It is evident that under the influence of the draw springs 27, the guide shoe 16 is drawn under spring bias towards the measuring system to be described hereinunder.

The reference numeral 9 designates a measuring roller which in the illustration shown in FIG. 2 lies on the reference plane 2 and in this case passes through a recess 30 in the base section 19 of the guide shoe 16. The measuring roller 9 is mounted on a roller holder 31 in such a manner as to be able to rotate about an axis 32 extending in parallel with the reference plane 2. The roller holder 31 is connected to a vertically mounted measuring linkage 33 which is operatively connected to a measuring transducer 40. The principle of said measuring transducer is based upon the fact that vertical movements of the measuring roller 9 with respect to the reference plane 2, i.e. in the direction of the arrows 12, are converted into an electrical signal, preferably a digital signal. This signal is transmitted to a control device and visually displayed, stored etc. therein in a suitable manner.

As illustrated in FIG. 4, the measuring roller 9 is located according to the positioning of the recess 30 in a central region of the base section 19, wherein on both sides of the roller holder 31, running rollers 34 are each mounted in such a manner as to be able to rotate about axes 35 in parallel with the axis 32 but below same. Both axes 32, 35 extend horizontally and perpendicularly with respect to the arrow 3, wherein the two running rollers 34 are disposed laterally in relation to the measuring roller 9 and therefore in the regions 36 on both sides of the recess 30 are mounted in such a manner as to be able to roll on the base section 19 of the guide shoe 16. The axes 32, 35 are positioned in conjunction with the diameters of the measuring roller 9 on the one hand and the running rollers 34 on the other hand with the proviso that—as shown in FIG. 2 of the drawing—the measuring roller 29 protrudes slightly out of the underside of the guide shoe 16.

The measuring linkage 33 is also operatively connected to a drive 41, schematically shown in FIG. 2, e.g. a pneumatically actuated piston-cylinder unit by means of which the running rollers 34 are held in position against the guide shoe 16 in the regions 36 and in conjunction with the draw springs 27 the required measuring force is applied. A reverse control 42 for controlling motion of the transducer including its associated measuring roller 9 is operatively associated with drive 41. The reverse control operates to hold the measuring roller 9 at a height position corresponding substantially to a thickness of a first of the objects 4 when the distance between the first object and a second object on the reference plane 2 exceeds a distance determined by the longitudinal extension of the guide shoe 16. The statements above show that the functional principle of the measuring device in accordance with the invention is based upon the fact that the guide shoe 16 can be pivoted by reason of its articulation on the points 23, 24, wherein only the vertical component of the total movement of the guide shoe 16 is transmitted by way of the running rollers 34 to the measuring linkage 33. The measurement object 1 which is moved in the direction of the arrow 3 in parallel with the reference plane 2 abuts with its corner 37 against the steeply extending ramp section 17 of the guide shoe 16, with which the deflection procedure of the guide shoe 16 about the points 23, 24 commences. The continuation of the deflection movement of the guide shoe 16 is determined kinematically by the consecutive ramp sections 17, 18, in particular their absolute lengths and angles with respect to the reference plane 2. Since merely the vertical component of the pivot movement of the guide shoe 16 is transmitted by way of the measuring roller 9, in comparison with the prior art set forth in the introduction a substantially lower vertical acceleration is achieved for the measuring roller 9 including functional elements disposed downstream thereof in the direction of the arrows 12. According to the angles of the consecutive ramp sections 17, 18 and of the base section 19, the pivot movement of the guide shoe 16 is characterised by an initially rapid acceleration which in the region of the ramp section 18 is characterised by a very much lower acceleration, in particular in the vertical direction also.

Starting from a "zero-setting" of the measuring system, in which the measuring roller 9 records the level of the reference plane 2, the measurement object 1 moving in the direction of the arrow 3 causes the guide shoe 16 and thus the measuring roller 9 to deflect to the actual value of the thickness 4 of the measurement object 1, wherein as a consequence the progression of this thickness value in the longitudinal direction of the measurement object 1 is scanned and logged. During this measuring procedure—as seen in the longitudinal direction of the measurement object 1—the measuring roller 9 is in contact with the side of the measurement object 1 facing it. Upon reaching the end of the measurement object 1, this state of deflection of the measuring roller 9 is stored as the desired value for the value of the thickness 4 of the subsequent measurement object. By way of the drive allocated to the measuring linkage, the running rollers 34 are held constantly in position against the base section 19.

In the event that the spacing between two consecutive measurement objects 1—as seen in the direction of the arrow 3—is smaller than a distance determined by the longitudinal extension of the guide shoe 16, so that by reason of the fact that the guide shoe 16 lies against the consecutive measurement objects 1, the guide shoe 16 is not able to pivot in any event up to the level of the reference plane 2, this spacing can be bridged without reversing the control of the drive of the measuring linkage 33.

In contrast, if the said gap turns out to be larger than the distance determined by the longitudinal extension of the guide shoe 16, reversing the control of the drive of the measuring linkage 33 ensures that said linkage remains in the last extended position and in any event is not moved down to the level of the reference plane 2. In actual fact, the measured value of the thickness of a measurement object 1 is stored as a desired value for the next measurement object 1. For this mode of operation it is necessary that the speed and the position of the measurement objects 1 can be established precisely by suitable sensors and that signals describing the status of movement and the position of the measurement objects are available in the higher-ranking control which serves also to control the drive of the measuring head. In each case, any recording of a measured value between two measurement objects is suppressed.

By reason of the measuring linkage movement which is caused by the configuration of the guide shoe 16 and is performed at a lower acceleration in comparison with the prior art, and also by reason of the opportunity provided by the guide shoes of bridging two consecutive measurement objects or storing the actual value of the thickness of the respectively preceding measurement object, there is also the advantage of substantially lower noise development in addition to a lower wear-inducing operation of the measuring device, reduced energy requirement or consumption of compressed air.

Figure 5:
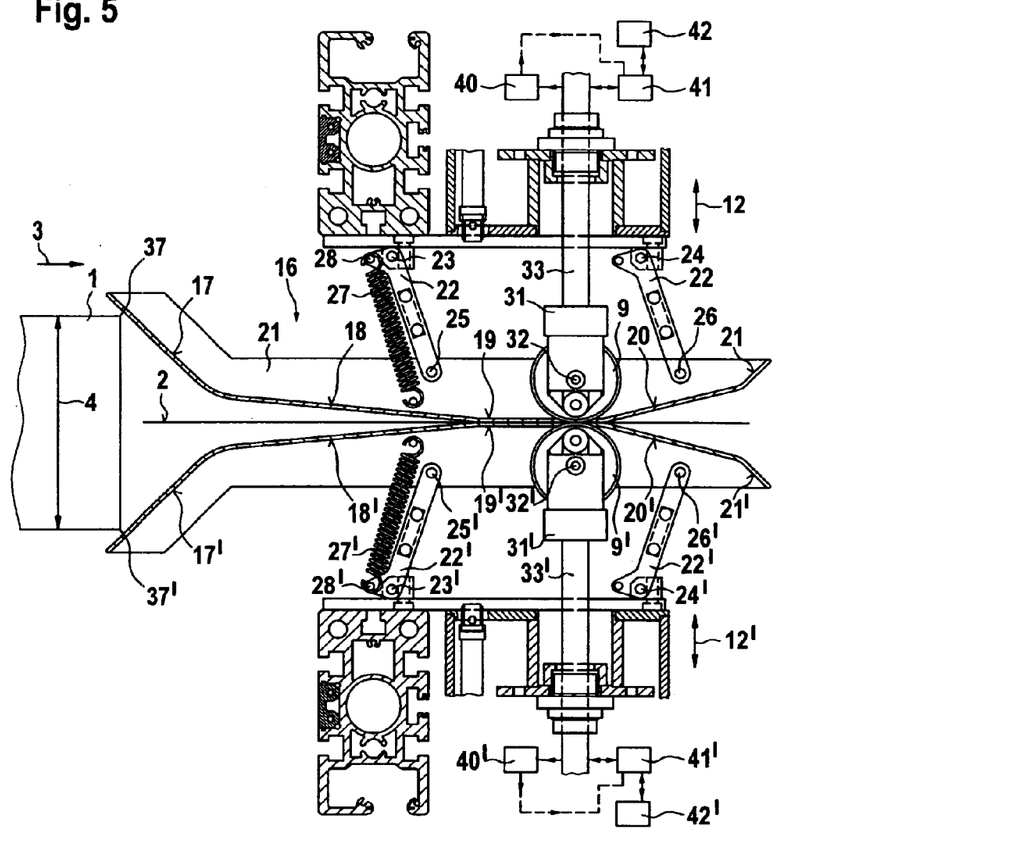
FIG. 5 shows a side view of an alternate embodiment of the measuring device according to the invention.

A measuring device in accordance with the invention has been described in the above presentation such that on one side of a reference plane 2 there is located a measuring system which cooperates with a guide shoe 16. For example, as shown in FIG. 5. this functional principle can be extended in an alternate embodiment such that below the measurement object 4 to be measured, there is located a substantially similar measuring device including a measuring roller 9' which in the same manner as the measuring roller 9 located above the measurement object 4 forms a part of a measuring system. Measuring the thickness in this case is based upon an evaluation of the deflection of the two measuring rollers 9 and 9', hence upon the formation of a difference value.

The alternate embodiment of FIG. 5 includes a second elongated guide shoe 16' being positionable to engage a surface of the object 4 opposite that of the first shoe 16. The second guide shoe 16' has a bottom surface 18' engageable with the object 4 as it moves past the device between the first and said second shoes 16 and 16'. The bottom surface of the second shoe has an opening therein to permit the second roller 9' to extend through the second guide shoe 16' for engagement with object 4. As further shown in FIG. 5. the measuring device positioned below the object 4 is substantially the same in configuration and operation as the device described above. Corresponding components are marked with a primed reference character, and due to the substantially similar nature of both devices a further detailed description of the alternate embodiment is superfluous.

What is claimed is:

1. A measuring device for measuring the thickness of objects, said device being mountable on a machine adapted to move the objects along a reference plane past said device, said device comprising:

an elongated guide shoe being positionable adjacent to said reference plane, said guide shoe having a bottom surface facing said reference plane and engageable with said objects as they move past said device between said shoe and said reference plane, said guide shoe having an opening in said bottom surface;

a linkage supporting said guide shoe such that said guide shoe is pivotally movable toward and away from said reference plane in the manner of a four-bar linkage in response to said objects passing between said guide shoe and said reference plane;

a transducer engageable with said guide shoe and having a measuring roller extending through said opening in said guide shoe bottom surface for engaging said objects, said transducer being biased into engagement with said guide shoe, said transducer generating an electrical signal proportional to motion of said measuring roller toward and away from said reference plane, said motion being indicative of the thickness of said objects.

2. A measuring device according to claim 1, wherein said linkage comprises first and second links extending between said guide shoe and said machine, said links being positioned in parallel, spaced-apart relation lengthwise along said guide shoe and pivotally mounted at one end to said machine, and at an opposite end to said guide shoe.

3. A measuring device according to claim 2, wherein said measuring roller is adapted to move in a direction perpendicular to said reference plane.

4. A measuring device according to claim 3, wherein said links are angularly oriented so as to displace said opposite ends of said links in the direction of motion of said objects moving past said device.

5. A measuring device according to claim 2, wherein said links are angularly oriented so as to displace said opposite ends of said links in the direction of motion of said objects moving past said device.

6. A measuring device according to claim 5, further comprising a biasing member engaging and resiliently biasing said guide shoe toward said transducer.

7. A measuring device according to claim 5, further comprising a reverse control for controlling motion of said transducer, said reverse control operating to hold said measuring roller at a height position corresponding substantially to a thickness of a first of said objects when the distance between said first object and a second of said objects on said reference plane exceeds a distance determined by the longitudinal extension of said guide shoe.

8. A measuring device according to claim 5, wherein recording of said thickness measured between a first and a second of said objects is suppressed when the distance between said first and second objects is less than a distance determined by the longitudinal extension of said guide shoe.

9. A measuring device according to claim 1, wherein said transducer extends from said machine and has an end engageable with said guide shoe, said measuring roller being mounted on said end and extending through said opening in said guide shoe bottom surface.

10. A measuring device according to claim 9, further comprising a drive unit engaging said transducer for biasing said transducer end into engagement with said guide shoe and said measuring roller into engagement with said objects.

11. A measuring device according to claim 9, further comprising a running roller positioned on said end of said transducer and engaging said guide shoe adjacent to said opening.

12. A measuring device according to claim 11, wherein said measuring roller is adapted to move in a direction perpendicular to said reference plane.

13. A measuring device according to claim 11, further comprising a biasing member engaging and resiliently biasing said guide shoe toward said transducer.

14. A measuring device according to claim 11, wherein said guide shoe comprises a plurality of segments attached end to end, said segment including:

a first segment angularly oriented at a first angle relative to said reference plane;

a second segment attached to said first segment and angularly oriented at a second angle relative to said reference plane, said second angle being less than said first angle;

a middle segment attached to said second segment and oriented substantially parallel to said reference plane;

a third segment attached to said middle segment and angularly oriented at a third angle relative to said reference plane; and a fourth segment attached to said third segment and angularly oriented at a fourth angle relative to said reference plane, said fourth angle being greater than said third angle.

15. A measuring device according to claim 11, further comprising a reverse control for controlling motion of said transducer, said reverse control operating to hold said measuring roller at a height position corresponding substantially to a thickness of a first of said objects when the distance between said first object and a second of said objects on said reference plane exceeds a distance determined by the longitudinal extension of said guide shoe.

16. A measuring device according to claim 11, wherein recording of said thickness measured between a first and a second of said objects is suppressed when the distance between said first and second objects is less than a distance determined by the longitudinal extension of said guide shoe.

17. A measuring device according to claim 1, further comprising a biasing member engaging and resiliently biasing said guide shoe toward said transducer.

18. A measuring device according to claim 17, wherein said guide shoe comprises a plurality of segments attached end to end, said segment including:
- a first segment angularly oriented at a first angle relative to said reference plane;
- a second segment attached to said first segment and angularly oriented at a second angle relative to said reference plane, said second angle being less than said first angle;
- a middle segment attached to said second segment and oriented substantially parallel to said reference plane;
- a third segment attached to said middle segment and angularly oriented at a third angle relative to said reference plane; and
- a fourth segment attached to said third segment and angularly oriented at a fourth angle relative to said reference plane, said fourth angle being greater than said third angle.

19. A measuring device according to claim 1, wherein said guide shoe comprises a plurality of segments attached end to end, said segments including:
- a first segment angularly oriented at a first angle relative to said reference plane;
- a second segment attached to said first segment and angularly oriented at a second angle relative to said reference plane, said second angle being less than said first angle;
- a middle segment attached to said second segment and oriented substantially parallel to said reference plane;
- a third segment attached to said middle segment and angularly oriented at a third angle relative to said reference plane; and
- a fourth segment attached to said third segment and angularly oriented at a fourth angle relative to said reference plane, said fourth angle being greater than said third angle.

20. A measuring device according to claim 19, further comprising a reverse control for controlling motion of said transducer, said reverse control operating to hold said measuring roller at a height position corresponding substantially to a thickness of a first of said objects when the distance between said first object and a second of said objects on said reference plane exceeds a distance determined by the longitudinal extension of said guide shoe.

21. A measuring device according to claim 19, wherein recording of said thickness measured between a first and a second of said objects is suppressed when the distance between said first and second objects is less than a distance determined by the longitudinal extension of said guide shoe.

22. A measuring device according to claim 1, further comprising a reverse control for controlling motion of said transducer, said reverse control operating to hold said measuring roller at a height position corresponding substantially to a thickness of a first of said objects when the distance between said first object and a second of said objects on said reference plane exceeds a distance determined by the longitudinal extension of said guide shoe.

23. A measuring device according to claim 22, further comprising:
- a second transducer; and
- a second measuring roller mounted on said second transducer and engageable with a surface of said object opposite that of said first named measuring roller, the displacement of said measuring rollers relative to said reference plane providing a measured value of the thickness of said object.

24. A measuring device according to claim 22, further comprising:
- a second elongated guide shoe being positionable to engage a surface of said object opposite that of said first named shoe, said second guide shoe having a bottom surface engageable with said object as it moves past said device between said first named and said second shoes, said bottom surface of said second shoe having an opening therein;
- a second transducer; and
- a second measuring roller mounted on said second transducer and engageable with said second guide shoe, said second measuring roller extending through said opening of said second guide shoe and being engageable with said surface of said object opposite that of said first named measuring roller, the displacement of said measuring rollers relative to said reference plane providing a measured value of the thickness of said object.

25. A measuring device according to claim 1, wherein recording of said thickness measured between a first and a second of said objects is suppressed when the distance between said first and second objects is less than a distance determined by the longitudinal extension of said guide shoe.

26. A measuring device according to claim 25, further comprising:
- a second transducer; and
- a second measuring roller mounted on said second transducer and engageable with a surface of said object opposite that of said first named measuring roller, the displacement of said measuring rollers relative to said reference plane providing a measured value of the thickness of said object.

27. A measuring device according to claim 25, further comprising:
- a second elongated guide shoe being positionable to engage a surface of said object opposite that of said first named shoe, said second guide shoe having a bottom surface engageable with said object as it moves past said device between said first named and said second shoes, said bottom surface of said second shoe having an opening therein;
- a second transducer; and
- a second measuring roller mounted on said second transducer and engageable with said second guide shoe, said second measuring roller extending through said opening of said second guide shoe and being engageable with said surface of said object opposite that of said first named measuring roller, the displacement of said measuring rollers relative to said reference plane providing a measured value of the thickness of said object.

28. A measuring device according to claim 1, further comprising:
- a second transducer; and
- a second measuring roller mounted on said second transducer and engageable with a surface of said object opposite that of said first named measuring roller, the displacement of said measuring rollers relative to said reference plane providing a measured value of the thickness of said object.

29. A measuring device according to claim 1, further comprising:

a second elongated guide shoe being positionable to engage a surface of said object opposite that of said first named shoe, said second guide shoe having a bottom surface engageable with said object as it moves past said device between said first named and said second shoes, said bottom surface of said second shoe having an opening therein;

a second transducer; and a second measuring roller mounted on said second transducer and engageable with said second guide shoe, said second measuring roller extending through said opening of said second guide shoe and being engageable with said surface of said object opposite that of said first named measuring roller, the displacement of said measuring rollers relative to said reference plane providing a measured value of the thickness of said object.

30. A measuring device according to claim 1, wherein said measuring roller is adapted to assume one of two positions in the event of an interruption of power to said device, said two positions being a position of withdrawal and a position last assumed by said measuring roller.

31. A method of measuring the thickness of an object, said method comprising the steps of:

moving said object along a reference plane;

engaging said object with an elongated guide shoe coupled with a measuring roller mounted at the end of a transducer, said object displacing said guide shoe and said measuring roller in a direction substantially perpendicularly away from said reference plane;

holding said guide shoe and said measuring roller at a distance from said reference plane substantially equal to said thickness of said object when the spacing between said object and another object on said reference plane is greater than the longitudinal extension of said guide shoe;

generating a signal with said transducer proportional to said displacement of said measuring roller;

deriving said thickness from said signal; and recording said thickness.

32. A method of measuring the thickness of an object according to claim 31, further comprising the step of withdrawing said measuring roller into a withdrawn position in the event of a power interruption.

33. A method of measuring the thickness of an object, said method comprising the steps of:

moving said object along a reference plane;

engaging said object with an elongated guide shoe coupled with a measuring roller mounted at the end of a transducer, said object displacing said guide shoe and said measuring roller in a direction substantially perpendicularly away from said reference plane;

generating a signal with said transducer proportional to said displacement of said measuring roller;

deriving said thickness from said signal;

recording said thickness; and suppressing the recording of measured thicknesses in a region between a first and a second object on said reference plane when the spacing between said objects is greater than the longitudinal extension of said guide shoe.

* * * * *